(12) United States Patent
Chapman

(10) Patent No.: US 7,605,839 B2
(45) Date of Patent: Oct. 20, 2009

(54) SYSTEM FOR REMOTELY RECORDING LANDSCAPE CHANGE

(76) Inventor: Mark Seton Chapman, 69 Sunshine Street, Manley Vale, NSW (AU)

( * ) Notice: Subject to any disclaimer, the term of this patent is extended or adjusted under 35 U.S.C. 154(b) by 762 days.

(21) Appl. No.: 10/781,826

(22) Filed: Feb. 20, 2004

(65) Prior Publication Data

US 2004/0184676 A1    Sep. 23, 2004

(30) Foreign Application Priority Data

Feb. 20, 2003    (AU) .............................. 2003900756

(51) Int. Cl.
*H04N 7/18* (2006.01)
*H04N 9/47* (2006.01)

(52) U.S. Cl. ......................................... 348/143; 348/89

(58) Field of Classification Search ............... 348/143, 348/144; 382/107, 154; 345/421; 73/31.02; 434/225; 340/541; 386/117
See application file for complete search history.

(56) References Cited

U.S. PATENT DOCUMENTS

| | | | | |
|---|---|---|---|---|
| 4,940,972 A | * | 7/1990 | Mouchot et al. ............ 345/421 |
| 5,166,789 A | * | 11/1992 | Myrick ....................... 348/144 |
| 5,692,062 A | * | 11/1997 | Lareau et al. ............... 382/107 |
| 6,623,274 B2 | * | 9/2003 | Kurumizawa ............... 434/225 |
| 6,963,662 B1 | * | 11/2005 | LeClerc et al. ............. 382/154 |
| 7,080,544 B2 | * | 7/2006 | Stepanik et al. ............ 73/31.02 |
| 7,151,448 B2 | * | 12/2006 | Henderson et al. ......... 340/541 |
| 2003/0002861 A1 | * | 1/2003 | Ichige et al. ................ 386/117 |

* cited by examiner

*Primary Examiner*—Gims S Philippe
(74) *Attorney, Agent, or Firm*—Birch, Stewart, Kolasch & Birch, LLP

(57) ABSTRACT

A system for remotely recording landscape change, the system including a digital imaging device and a processor and communication with a memory means and with the digital imaging device. The system further includes a battery electrically connected to the processor and the digital imaging device, and a controller electrically disposed intermediate the battery and the digital imaging device and the processor. The controller is configured to isochronally provide power from the battery to the processor and digital imaging device whereby the digital imaging device acquires a landscape image which is communicated to the processor which in turns transmits the image to a remote processor. The images are are presented as a video of the images by the remote processor, preferably via an Internet web browser.

21 Claims, 2 Drawing Sheets

SYSTEM FOR REMOTELY RECORDING LANDSCAPE CHANGE

This Nonprovisional application claims priority under 35 U.S.C. § 119(a) on Patent Application No(s). 2003900756 filed in AUSTRALIA on Feb. 20, 2003, the entire contents of which are hereby incorporated by reference.

FIELD OF THE INVENTION

The invention relates to landscape change and, in particular, to a system for remotely recording landscape change.

The invention has been developed primarily for use in producing video presentations of construction site progress and will be described in hereinafter with reference to this application. However, it would be appreciated that the invention is not limited to this particular field of use and is applicable to other landscape change such as farmland change or glacial change.

BACKGROUND OF THE INVENTION

It has long been known to film the construction of large buildings so as to produce video presentation footage of the progress of the construction. It is normal for a short movie, typically of the order of two to three minutes in length, to be produced in which the progress of the construction site is periodically monitored.

It is known to place clockwork movie cameras on buildings or properties adjacent construction sites and configuring the cameras to record one image frame of the construction site every pre-determined period, typically one frame per day. In so far as construction sites generally take of the order of one to three years to complete, the clockwork movie cameras need to be serviced monthly to at least reload film. An example of such clockwork movie cameras is the Bolex™ 16 mm clockwork movie camera.

In known systems, since the clockwork movie camera film needs to be reloaded on a regular basis, images of the construction site is not available at least until the end of the month when the film was reloaded. Typically, edited file of the site images are not available until the end of all construction and when all the images are at hand.

Clockwork movie cameras so such as the Bolex™ 16 mm are self contained in that they require no external power source or other electrical connections. This is advantageous since the clockwork movie cameras are located on buildings or properties adjacent a construction site. The clockwork movie cameras must therefore be only temporarily mounted to the adjacent building or properties and must not cause any damage during their installation or removal. Furthermore, it is normally the case that communication or power cables cannot be run to a camera on the adjacent buildings.

Similarly in the case of environmental change to farmland, for example, where the growth of crops or deterioration of soil over a period such as one to three years needs to be observed. In such cases, no power or electrical connections are available and it can be the case that the farmland change being recorded is too isolated to be visited each month to change film when using a clockwork movie camera.

OBJECT OF THE INVENTION

It is an object of the invention to provide a system for remotely recording landscape change which will overcome or substantially ameliorate at least some of the deficiencies of the prior art, or to provide a useful alternative.

SUMMARY OF THE INVENTION

According to a first aspect of the invention there is provided a system for remotely recording landscape change, the system including:
a digital imaging device;
a processor and communication with a memory means and with the digital imaging device;
a battery electrically connected to the processor and the digital imaging device; and
a controller electrically disposed intermediate the battery and the digital imaging device and the processor, the controller being configured to isochronally provide power from the battery to the processor and digital imaging device whereby the digital imaging device acquires a landscape image which is communicated to the processor which in turns transmits the image to a remote processor.

Therefore, there is provided a system for remotely recording landscape change which does not require any regular servicing or any externally supplied power or communication connections. Furthermore, the system provides landscape images that can be viewed once an image has been transmitted to the remote processor.

Preferably, the controller includes a mechanical or electronic timer and switch for isochronally providing power to the processor and digital imaging device. More preferably, the processor and memory means are disposed in a portable computer deriving its power from the battery via a portable computer power supply.

In preferred embodiments, the portable computer is connected to a modem being integral with or external to the portable computer, the portable computer modem being in communication with the remote processor modem for remote communicating the image thereto.

Preferably, the controller is configured to provide power to the processor and digital imaging device at a predetermined number of times each day and thereby transmit a predetermined number of landscape images each day to the remote processor. Also preferably, the digital imaging device and the processor are each disposed within a fully sealed enclosure.

In preferred embodiments, one or more solar panels electrically connected to the input of a charge regulator, the output of the charge regulator being electrically connected to the battery for providing power thereto.

Preferably, once the image has been transmitted to the remote processor, the controller electrically isolates the battery from the digital imaging device and processor. More preferably, the system includes an electrical switch disposed intermediate the digital imaging device and the battery, and the processor and the battery, the switches being operable in response to a signal from the controller to electrically connect or isolate the battery and digital imaging device and/or battery and processor.

In preferred embodiments, the system is disposed adjacent a construction site or farmland to acquire landscape images thereof.

According to another aspect of the invention there is provided a method of remotely recording landscape change, the method including the steps of:
isochronally providing electrical power to a digital imaging device and processor having memory means;
acquiring a digital image of the landscape with the digital imaging device;

communicating the digital image to the processor;

transmitting the digital image from the processor to a remote processor; and disconnecting the electrical power to the digital imaging device and the processor.

Preferably, the method includes the step of electronically disposing a controller in communication with the processor and digital imaging device for isochronally providing power thereto. More preferably, the digital image of the landscape is transmitted to the remote processor via a modem electrically connected to each processor and in communication therebetween.

In preferred embodiments, the power is isochronally provided to the digital imaging device and processor once per day and for a predetermined period of time. Also preferably, the method includes the step of electronically connecting one or more solar panels to the battery via a charge regulator.

Preferably, the step of acquiring a digital image of the landscape consists of acquiring a digital image of a construction site or farmland.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

Figure 1:
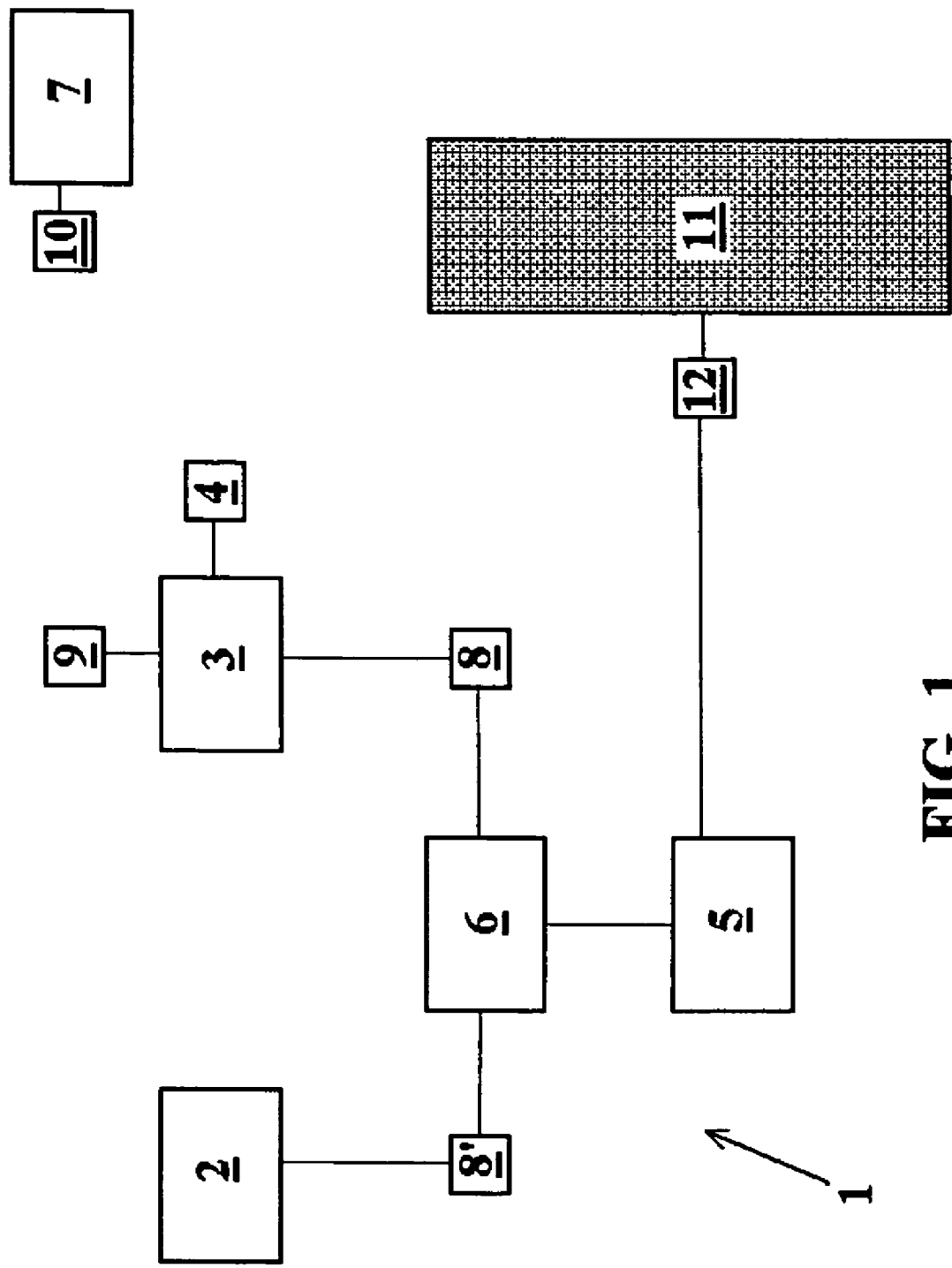
FIG. 1 is a schematic view of a system for remote construction site surveillance in accordance with the embodiment.

Referring to FIG. 1, there is illustrated a system 1 for remote constructions site surveillance. The system 1 includes a digital imaging device 2 disposed on an adjacent building or property to the construction site. The imaging device 2 is in communication with a processor 3.

The processor 3 is in communication with a memory means 4. A battery 5 is electrically connected to the processor 3 and digital imaging device 2 for providing power thereto. A controller 6 is electrically disposed intermediate the battery 5 and the digital and the digital imaging device 2 and the processor 3.

The controller 6 is configured to isochronally provide power from the battery 5 to the digital imaging device 2 and processor 3. When power is provided to the digital imaging device 2 and processor 3, the digital imaging device acquires an image of the construction site which is communicated to the processor 3. The processor 3 in turn transmits the construction site image to a remote processor 7.

Therefore, there is provided a system 1 for remote construction site surveillance which does not require any regular servicing or any externally supplied power or communication connections. That is, digital construction site images are transmitted to a remote processor removing the need for regular servicing of the digital imaging device 2. Further, the battery 5 provides power to the system 1 so that externally supplied power to the system 1 on the adjacent building or property to the construction site is not required. It can also be seen that construction site progress can be monitored for all images that have been transmitted to the remote processor.

The controller 6 includes an electrical switch (not illustrated) disposed electrically intermediate a digital imaging device 2 and the battery 5, and the processor 3 and the battery 5. The electrical switch is operable in response to a signal from the controller 6 to electrically connect or isolate the battery 5 and the digital imaging device 2 and/or the battery 5 and the processor 3. In other embodiments of the invention, also not illustrated, the controller 6 includes a mechanical switch.

The controller 6 further includes an electronic or mechanical timer for isochronally connecting or isolating the battery from the digital imaging device 2 and/or the processor 3 via the electrical switch (not illustrated). It is noted that any suitable switching arrangement can be employed.

The controller 6 is configured to isochronally provide power to the processor 3 and digital imaging device 2 once per day. When power is provided to the processor 3 and digital imaging device 2, the processor 3 is configured to actuate the digital imaging device 2 to acquire a digital image of the constructions site. The construction site image is communicated to the processor 3 which subsequently transmits the digital image to the remote processor 7. That is, one digital image of the construction site is transmitted to the remote processor 7 per day. It is noted, however, that any number of images per day or per other time period can be acquired in the system 1.

Once the processor 3 has transmitted the construction site image to the remote processor 7, the controller 6 electrically isolates the battery 5 from the digital imaging device 2 and the processor 3. It is noted that in other embodiments of the invention, not illustrated, the controller 6 disconnects power to the digital imaging device once the construction site image has been communicated therefrom to the processor 3, and disconnects power to the processor 3 once the construction site image has been transmitted to the remote processor 7.

The processor 3 and memory means 4 are disposed in a portable computer (not illustrated). The portable computer derives its power from the battery 5 via a portable computer power supply 8 and the digital imaging device 2 derives its power from the battery 5 via an imaging device power supply 8'.

The portable computer is connected to a portable computer modem 9 that can be integral with or external to the portable computer. The portable computer modem 9 is in communication with a remote processor modem 10 for remotely communicating construction site images between the remote processor 7 and processor 3.

The modems 9 and 10 are GPRS modems communicating over a GSM mobile telephone network, however, any known wireless communication means can be employed for communication between the processor 3 and remote processor 7.

The system 1 includes one or more solar panels 11 electrically connected to the input of a charge regulator 12. The output of the charge regulator 12 is electrically connected to the battery 5 for providing power thereto. In this way, no servicing or battery replacement is required.

In the system 1, the portable computer (not illustrated) and digital imaging device 2 are each disposed within sealed in moisture-proof enclosures (not illustrated). The enclosures and other elements of the system 1 are housed in an unsealed and weatherproof insulated enclosure (also not illustrated). In this way, the temperature of the digital imaging device 2 and the portable computer are regulated to keep the temperatures as constant as possible. It is noted, however, that other enclosures may be employed to house the system 1.

In a particularly preferred embodiment of the system 1, the digital imaging device 2 is in the form of a Cannon™ A40 digital stills camera having a CCD chip size of 1200×1600 pixels. The Cannon™ A40 is configured to be turned on or off in response to predetermined signals to the controller 6 by means of electrical cable extending between the controller 6 and the Cannon™ A40 camera.

The portable computer can be any computing device capable of manipulating 1200×1600 pixel images. The personal computer can be in the form of a Dell™ Insperon laptop with the screen preferably removed to reduce power consumption of the portable computer. The portable computer and remote processor modems are capable of data transfer rates greater than 20 Kbps and operable by a power supply of 12 volts or less.

The battery 5 is preferably a 12 volt 30 amp deep cycle sealed marine battery and the controller 6 includes a 12 volt power adapter.

The controller 6 also preferably includes an industrial timer capable of one second programming for providing power to the digital imaging device 2 and the processor 3.

The Cannon™ A40 digital stills camera includes remote access software such that the processor 3 can selectively configure the digital stills camera when power is supplied to both the camera and the processor 3.

The Cannon™ A40 digital stills camera is mounted on a standard camera mount allowing the camera to be selectively adjacent the construction site to directionally configure the camera for taking images.

The remote processor 7 is configured to receive images from the digital imaging device 2 and compile them in a database (not illustrated). The compiled images are then used to form a chronological video presentation of the images. The video presentation can be formed by sequentially displaying the images chronologically or by forming a specific digital presentation format such as an mpeg or the like. In this latter embodiment, a flash player or other interface is used to display all the images at a predetermined frame rate.

Figure 2:
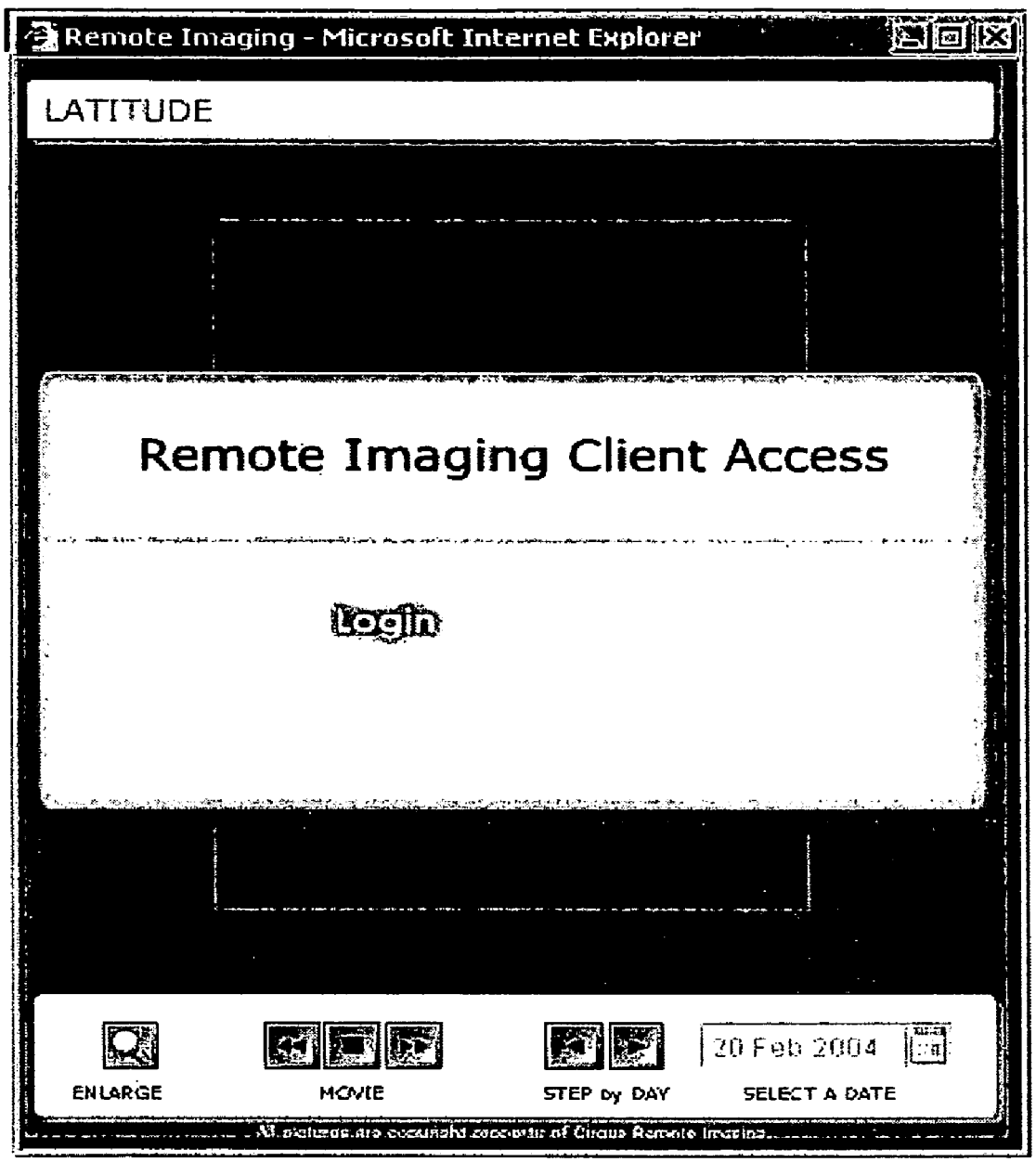
FIG. 2 is a computer screen representation of a presentation system for display images captured by the system of FIG. 1.

FIG. 2 is a computer screen representation showing when a flash player is employed to display the images. The flash player is configured to allow the presentation to be viewed for images taken at predetermined times. The presentation can be stepped image by image chronologically forward or backward and the usual digital manipulations can be performed on the images. Further, the presentation is configured to be accessed over the Internet as integrated into a web page. As security is important, the web page includes an internet login enabling user access.

The foregoing describes only a preferred embodiment of the present invention and modifications, obvious to those skilled in the art, can be made thereto without departing from the scope of the present invention. It is noted that the present invention can be disposed adjacent any landscape in which changes thereto are desired to be recorded, for example, farmland or an ice glacier.

The invention claimed is:

1. A system for remotely recording changes to a particular landscape, the system including:
    a digital imaging device;
    a processor in communication with a memory means and with the digital imaging device;
    a battery electrically connected to the processor and the digital imaging device; and
    a controller electrically disposed intermediate the battery and the digital imaging device and the processor, the controller being configured to isochronally provide power from the battery to the processor and digital imaging device to enable the digital imaging device, when stationary, to acquire a landscape image which is communicated to the processor which in turns transmits the image to a remote processor.

2. A system according to claim 1 wherein the controller includes a mechanical or electronic timer and switch for isochronally providing power to the processor and digital imaging device.

3. A system according to claim 1 wherein the processor and memory means are disposed in a portable computer deriving its power from the battery via a portable computer power supply.

4. A system according to claim 1 wherein the portable computer is connected to a modem being integral with or external to the portable computer, the portable computer modem being in communication with the remote processor modem for remote communicating the image thereto.

5. A system according to claim 1 wherein the controller is configured to provide power to the processor and digital imaging device at a predetermined number of times each day and thereby transmit a predetermined number of landscape images each day to the remote processor.

6. A system according to claim 1 including one or more solar panels electrically connected to the input of a charge regulator, the output of the charge regulator being electrically connected to the battery for providing power thereto.

7. A system according to claim 1 wherein the digital imaging device and the processor are each disposed within a fully sealed enclosure.

8. A system according to claim 1 wherein once the image has been transmitted to the remote processor, the controller electrically isolates the battery from the digital imaging device and processor.

9. A system according to claim 1 including an electrical switch disposed intermediate the digital imaging device and the battery, and the processor and the battery, the switches being operable in response to a signal from the controller to electrically connect or isolate the battery and digital imaging device and/or battery and processor.

10. A system according to claim 1 being disposed adjacent a construction site or farmland to acquire landscape images thereof.

11. A system according to claim 1 wherein the remote processor compiles received images into a video image presentation.

12. A method of remotely recording changes to a particular landscape, the method including the steps of:
    isochronally providing electrical power to a stationary digital imaging device and processor having memory means;
    acquiring a digital image of the landscape with the stationary digital imaging device;
    communicating the digital image to the processor;
    transmitting the digital image from the processor to a remote processor; and
    disconnecting the electrical power to the digital imaging device and the processor.

13. A method according to claim 12 including the step of: electronically disposing a controller in communication with the processor and digital imaging device for isochronally providing power thereto.

14. A method according to claim 12 wherein the digital image of the landscape is transmitted to the remote processor via a modem electrically connected to each processor.

15. A method according to claim 12 wherein the power is isochronally provided to the digital imaging device and processor once per day and for a predetermined period of time.

16. A method according to claim 12 including the step of electronically connecting one or more solar panels to the battery via a charge regulator.

17. A method according to claim 12 including the step of disposing the digital imaging device and processor in a fully sealed enclosure.

18. A method according to claim 12 wherein the step of acquiring a digital image of the landscape consists of acquiring a digital image of a construction site or farmland.

19. A method according to claim 12 including the step of the remote processor compiling the acquired digital images into an internet browser configured for displaying a video presentation of the images.

20. A system according to claim 1, wherein the system is adapted to produce a video presentation.

21. A method according to claim 12, further comprising the step of:

producing a video presentation using the acquired digital landscape image.

* * * * *